(12) United States Patent
Sabeti

(10) Patent No.: US 11,393,217 B2
(45) Date of Patent: *Jul. 19, 2022

(54) VEHICULAR VISION SYSTEM WITH DETECTION AND TRACKING OF OBJECTS AT THE SIDE OF A VEHICLE

(71) Applicant: MAGNA ELECTRONICS INC., Auburn Hills, MI (US)

(72) Inventor: Leila Sabeti, Toronto (CA)

(73) Assignee: MAGNA ELECTRONICS INC., Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/248,777

(22) Filed: Feb. 8, 2021

(65) Prior Publication Data

US 2021/0182573 A1    Jun. 17, 2021

Related U.S. Application Data

(63) Continuation of application No. 16/679,378, filed on Nov. 11, 2019, now Pat. No. 10,915,761, which is a continuation of application No. 16/278,294, filed on Feb. 18, 2019, now Pat. No. 10,474,909, which is a continuation of application No. 14/572,017, filed on Dec. 16, 2014, now Pat. No. 10,210,399.

(60) Provisional application No. 61/919,129, filed on Dec. 20, 2013.

(51) Int. Cl.
*G06V 20/56* (2022.01)
*H04N 7/18* (2006.01)
*B60Q 9/00* (2006.01)
*G08G 1/16* (2006.01)
*G06V 20/58* (2022.01)

(52) U.S. Cl.
CPC ............. *G06V 20/56* (2022.01); *B60Q 9/008* (2013.01); *G06V 20/58* (2022.01); *G08G 1/166* (2013.01); *H04N 7/183* (2013.01)

(58) Field of Classification Search
CPC ........ G06V 20/56; G06V 20/58; B60Q 9/008; G06K 9/00791; G06K 9/00805; H04N 7/183

See application file for complete search history.

(56) References Cited

U.S. PATENT DOCUMENTS

| 5,311,305 A | 5/1994 | Mahadevan et al. |
| 5,550,677 A | 8/1996 | Schofield et al. |
| 5,670,935 A | 9/1997 | Schofield et al. |
| 5,949,331 A | 9/1999 | Schofield et al. |

(Continued)

*Primary Examiner* — Kathleen V Nguyen
(74) *Attorney, Agent, or Firm* — Honigman LLP

(57) ABSTRACT

A vehicular vision system includes a camera at a side of a vehicle and having a field of view exterior of the vehicle. With the vehicle parked, the system processes via an image processor image data captured by the camera to detect an object present in a detection zone at least partially along the side of the vehicle. With the vehicle parked, the system tracks the detected object to determine movement of the object relative to the parked vehicle. Responsive to tracking the detected object, the system is operable to determine that the object is in a danger zone at a side door of the parked vehicle that includes a sweep area that the side door swings through when opening. With the side door closed, and at least in part responsive to determination that the object is in the danger zone, the system limits opening of the side door.

25 Claims, 9 Drawing Sheets

(56) References Cited

U.S. PATENT DOCUMENTS

| | | |
|---|---|---|
| 6,380,986 B1 | 4/2002 | Minami et al. |
| 7,038,577 B2 | 5/2006 | Pawlicki et al. |
| 7,149,366 B1 | 12/2006 | Sun |
| 7,532,109 B2 | 5/2009 | Takahama et al. |
| 7,720,580 B2 | 5/2010 | Higgins-Luthman |
| 7,855,755 B2 | 12/2010 | Weller et al. |
| 8,027,029 B2 | 9/2011 | Lu et al. |
| 9,205,776 B2 | 12/2015 | Turk |
| 9,319,637 B2 | 4/2016 | Lu et al. |
| 10,210,399 B2 | 2/2019 | Sabeti |
| 10,474,909 B2 | 11/2019 | Sabeti |
| 10,915,761 B2 | 2/2021 | Sabeti |
| 2002/0186298 A1 | 12/2002 | Ikeda |
| 2003/0138133 A1 | 7/2003 | Nagaoka et al. |
| 2008/0159591 A1 | 7/2008 | Ruedin |
| 2009/0041302 A1 | 2/2009 | Nagaoka et al. |
| 2010/0082206 A1* | 4/2010 | Kollar ............... E05F 15/43 701/49 |
| 2010/0253492 A1* | 10/2010 | Seder ............... G01S 13/931 348/148 |
| 2011/0018700 A1* | 1/2011 | Stein ............... G08G 1/167 340/436 |
| 2012/0008019 A1 | 1/2012 | Zhang et al. |
| 2013/0100286 A1 | 4/2013 | Lao |
| 2013/0250114 A1 | 9/2013 | Lu |
| 2014/0043473 A1 | 2/2014 | Gupta et al. |
| 2014/0169627 A1 | 6/2014 | Gupta |
| 2014/0257630 A1 | 9/2014 | Ruiz et al. |
| 2015/0049193 A1 | 2/2015 | Gupta et al. |
| 2015/0178576 A1 | 6/2015 | Gupta |
| 2015/0179074 A1 | 6/2015 | Gupta |
| 2016/0075332 A1 | 3/2016 | Edo-Ros |

\* cited by examiner

Marked Ground surface

Segmented Ground surface

Ground points travel the same distance in the opposite direction of the vehicle

VEHICULAR VISION SYSTEM WITH DETECTION AND TRACKING OF OBJECTS AT THE SIDE OF A VEHICLE

CROSS REFERENCE TO RELATED APPLICATIONS

The present application is a continuation of U.S. patent application Ser. No. 16/679,378, filed Nov. 11, 2019, now U.S. Pat. No. 10,915,761, which is a continuation of U.S. patent application Ser. No. 16/278,294, filed Feb. 18, 2019, now U.S. Pat. No. 10,474,909, which is a continuation of U.S. patent application Ser. No. 14/572,017, filed Dec. 16, 2014, now U.S. Pat. No. 10,210,399, which claims the filing benefits of U.S. provisional application Ser. No. 61/919,129, filed Dec. 20, 2013, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up.

The determination of the pedestrian or bicycle or object may use foreground segmentation utilizing a Gaussian mixture model. Responsive to processing of captured image data by the image processor, the vision system may determine that a ground location of a distal portion of the determined pedestrian or bicycle or object and, responsive to the determined ground location of the distal portion of the determined pedestrian or bicycle or object, the vision system may determine a distance to the determined pedestrian or bicycle or object. The present invention thus provides pedestrian or bicycle or object detection at or approaching the vehicle, such as at a side of the vehicle, and responsive to such detection, the system may generate an alert to the driver of the vehicle of the presence or approach of the detected pedestrian or bicycle or object and/or may limit opening of the vehicle door at that side.

Optionally, the system of the present invention may (also or otherwise), using a kinematics model, detect and track areas or regions at a ground surface to determine objects or surfaces that are and are not moving with the vehicle to mark or determine surfaces that are at the fixed ground. Optionally, the system of the present invention may detect and track objects over multiple frames of captured image data by determining the objects using a most similar block determination. In such a process, the system may search for similar blocks or portions of the frames of captured image data by processing sub-portions or sub-arrays of the imaging array.

Optionally, the image processor may be operable to detect and track an object over multiple frames of captured image data by determining the object using a block determination. The vision system may use (i) a first algorithm to rapidly find the object, (ii) a second algorithm to increase the accuracy while checking the search area and choosing how and where to search to enhance rapid determination of a location of the object, and (iii) a third algorithm that looks at a larger area for faster moving objects.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
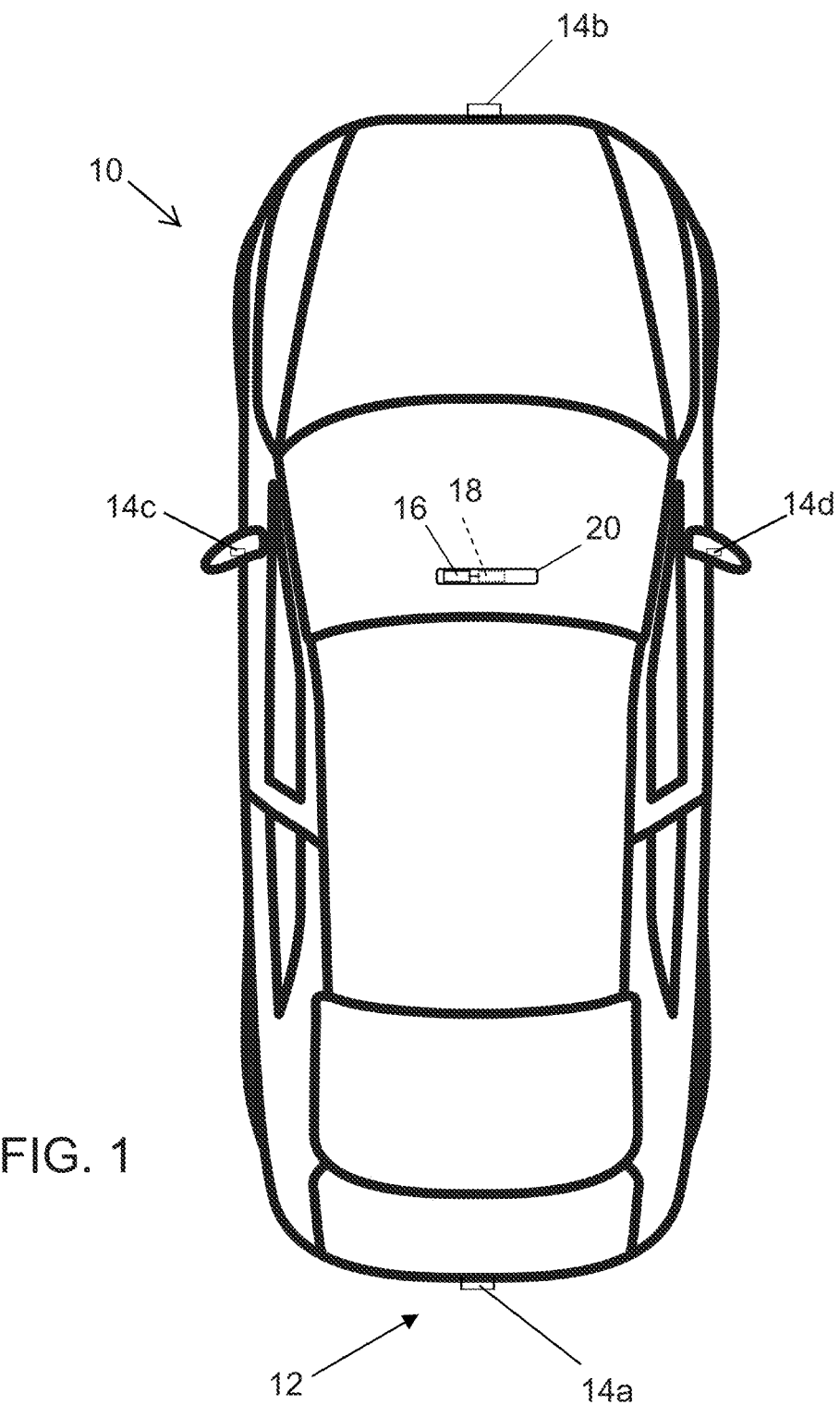
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
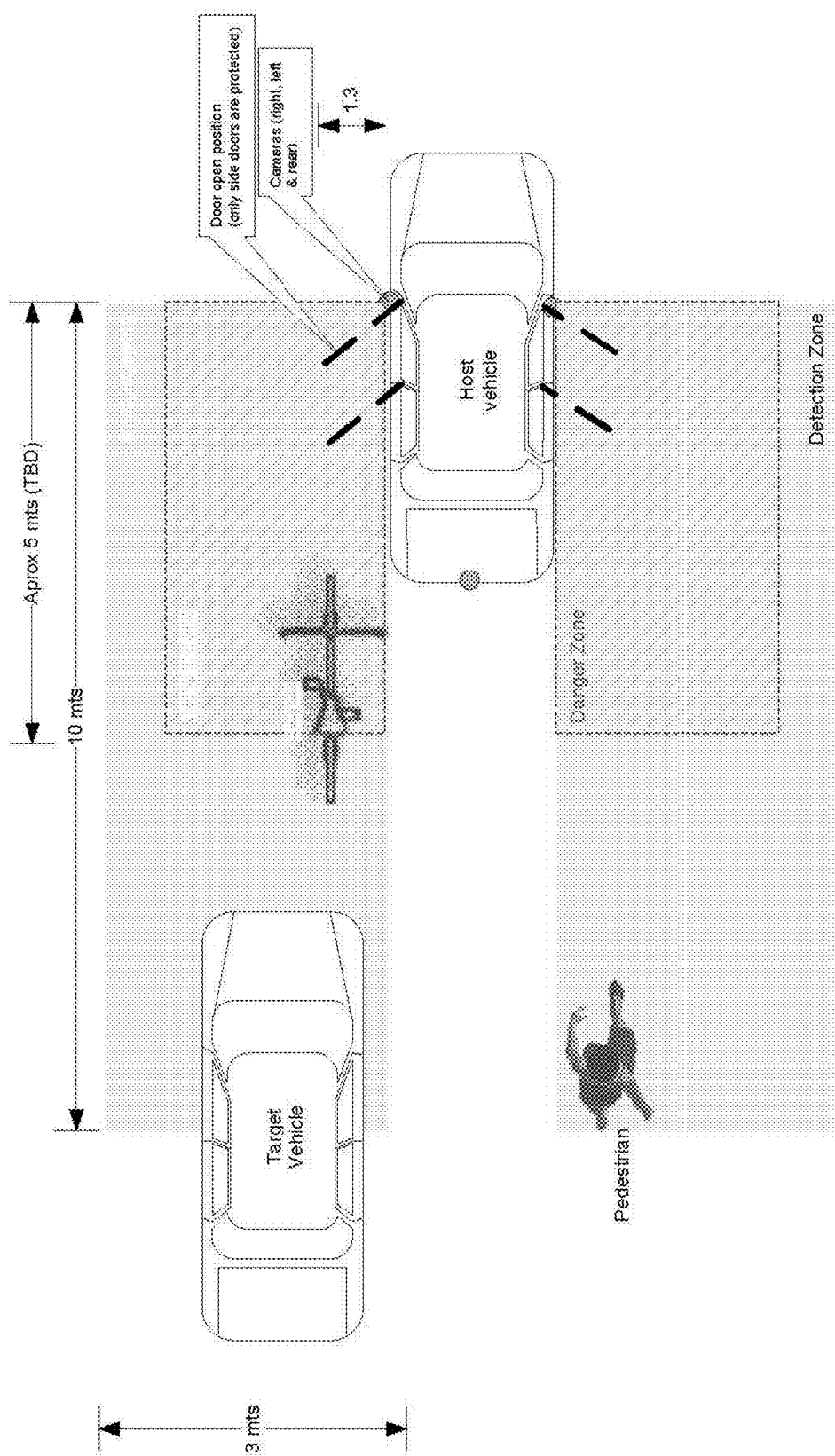
FIG. 2 is a schematic showing a parked vehicle and lanes of vehicle and/or bicycle traffic at either side of the vehicle.
Figure 3:
FIGS. 3 and 4 are images showing near collisions between a bicyclist and an opening vehicle door.
Figure 4:
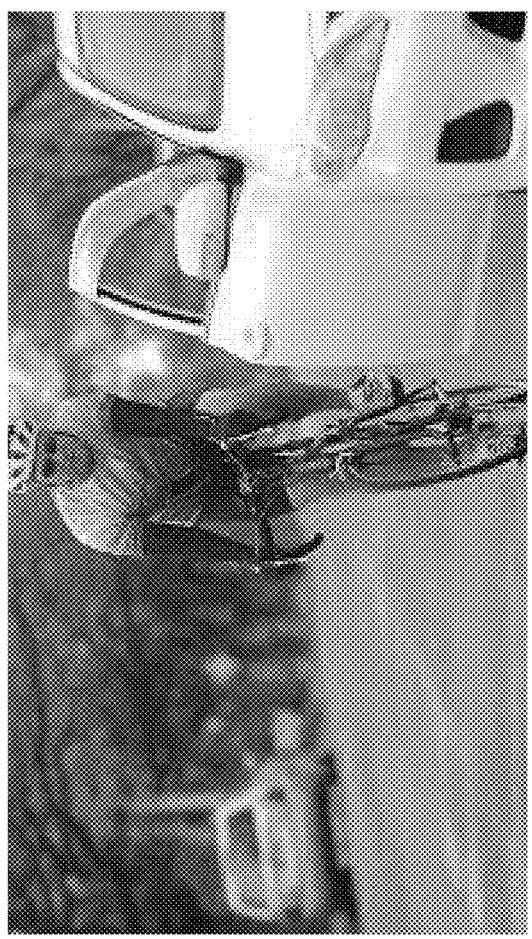

Bicycle/Pedestrian/Object Detection System:

In many countries, bicycle lanes are located next to the parallel parking slot, and many cyclists have been injured when a person in a parked or non-moving vehicle opens the vehicle door into the bicycle lane (near cyclist collisions with vehicle doors are shown in FIGS. 3 and 4). Vehicle doors may also be damaged when they are opened in the path of an approaching vehicle that is driving along the road near the parked or non-moving vehicle. The door open protection function of the present invention monitors objects that are in the path of a door open trajectory and warns the driver or passenger of the vehicle or may limit or restrict door opening (whereby the driver or passenger could override the door opening restriction). The detection zones along and behind a vehicle are shown in FIG. 2.

The present invention provides an algorithm and system that is operable to detect and track pedestrians, vehicles and bicycles that are present and traveling along the path next to where the vehicle is parked. If the system determines that there is a possibility or likelihood that the detected object may collide with the vehicle door if the vehicle door is opened, the system may generate an alert to the driver and/or passenger of the vehicle.

The pedestrian protection system of the present invention may use foreground segmentation using a Gaussian mixture model. When there is a sudden illumination change detection, the system merges an illumination invariant edge based technique. The algorithm (Gaussian mixture) works better with sudden illumination changes compared to other methods, but no edge-based system is immune to these changes, particularly in darker environments. The system may provide distance estimation using only two dimensional information from the still side camera. Responsive to such detection, the system may provide an alert or warning to the driver of the parked vehicle.

Figure 7:
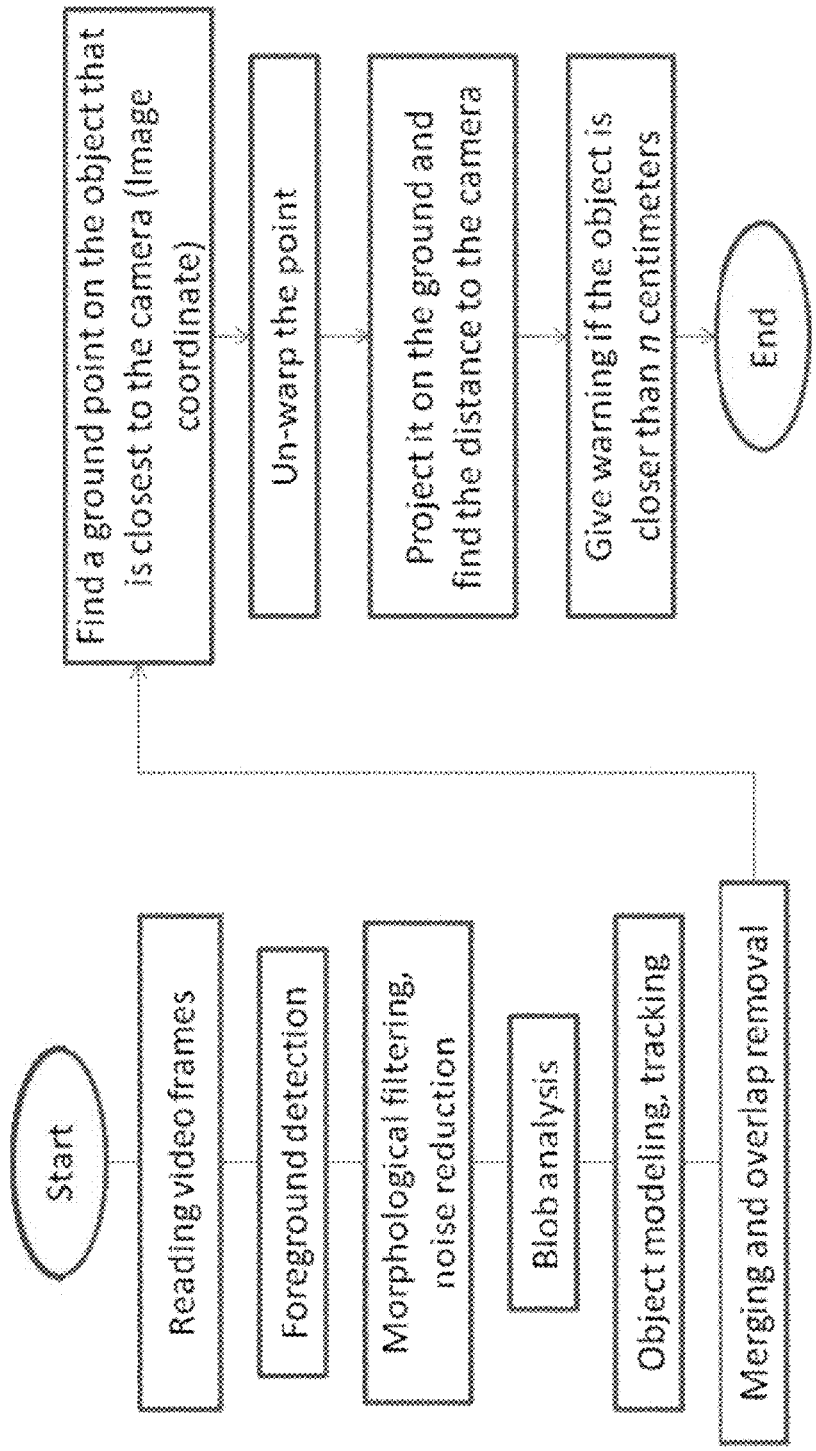
FIG. 7 is a flow chart showing the detection or image data processing process to detect objects via blob analysis.

The goal of the algorithm of the system of the present invention is to detect and track pedestrians, vehicles or bicycles on the path next to where a vehicle is parked and to provide a warning if there is chance that they collide to the parked vehicle's side door. A block diagram of the algorithm is shown in FIG. 7.

A Gaussian mixture model foreground segmentation is preferably used by the system to detect potential moving objects or "blobs". Such a model has advantages over other techniques such as feature tracking methods especially when the camera is stationary.

By using features, the system may not be able to find enough strong features on the object and even if it finds some, the silhouette of the object may not be available. Not having this information can end up in estimation error when calculating objects distance from the camera. This means, late or very early warning can easily happen every time an object is in the path next to the parked car. Another disadvantage is that the system may not be sure if detected features are really on the object or part of the background. For these reasons and because the camera is stationary, motion detection and estimation methods are superior and therefore a better choice for door open protection (DOP) application.

The advantages of using a Gaussian mixture model compared to other methods (such as single Gaussian) is that this method better adapts to lighting changes and repetitive motion of scene elements. It also allows for new additions to the background model.

In the background subtraction algorithm based on the Gaussian mixture method, pixel values that do not fit the background distributions are considered foreground until there is a Gaussian that includes them with sufficient, consistent evidence supporting it. In this system, Gaussian mixture model with 3 Gaussian distributions are considered and each pixel is modeled by a Gaussian mixture.

Morphological operations are applied to the resulting foreground mask to eliminate noise. Finally, blob analysis detects groups of connected pixels, which are likely to correspond to moving objects.

Color video frames with the size of 1200×800 are read sequentially. Morphological opening is then used to reduce noise in the binary image output of the background/foreground segmentation function.

Blob analysis is performed by the system to detect connected components followed by object modeling, which estimates bounding boxes and center coordinate of potential objects together with their pixel list. Finally, bounding boxes with close overlap are merged together.

Figure 8:
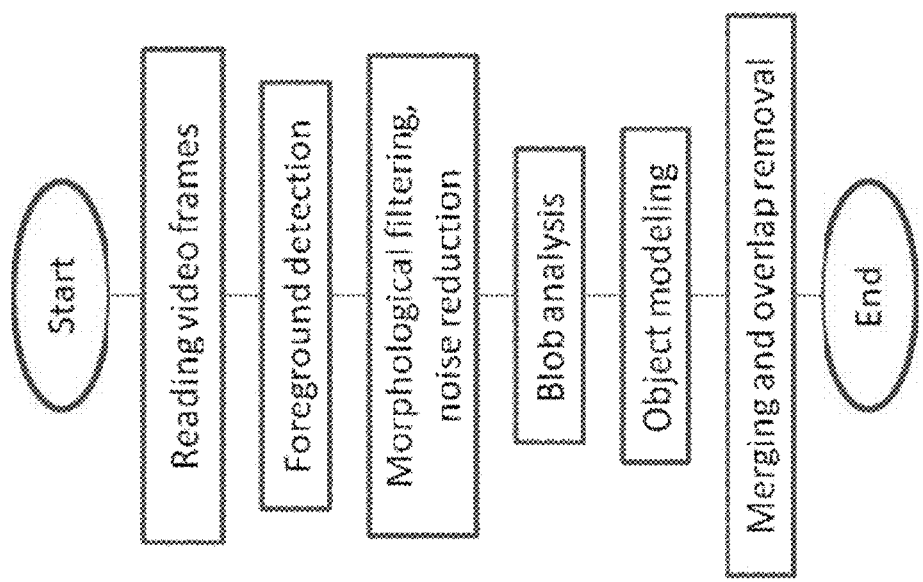
FIG. 8 is a flow chart showing the distance estimation process suitable for use in the system of the present invention.
Figure 9:
FIG. 9 is an image showing marked ground surface areas for use in determining moving objects and stationary objects in accordance with the present invention.
Figure 11:
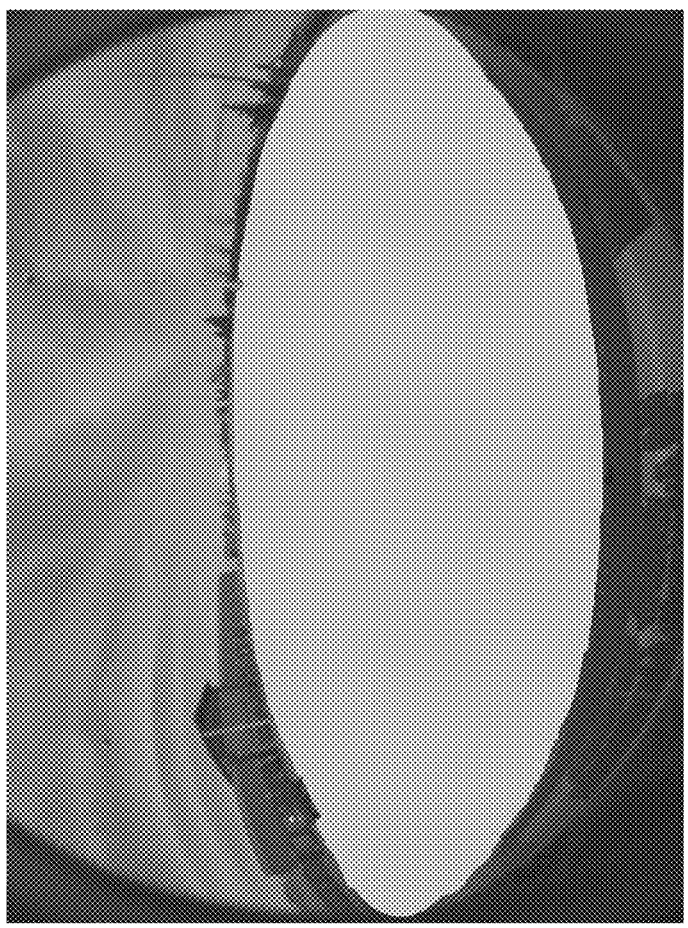
FIG. 11 is an image showing a segmented ground surface with the areas that are determined to be ground areas removed from the image.
Figure 10:
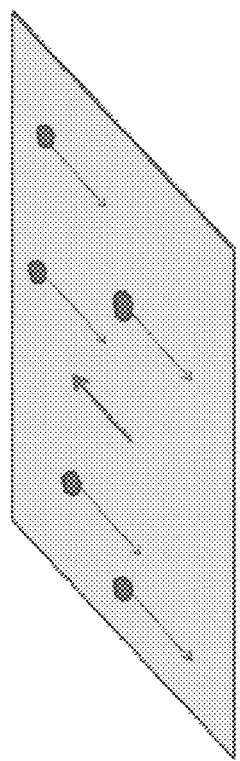
FIG. 10 is a schematic showing how ground points or areas move relative to the moving vehicle.
Figure 12:
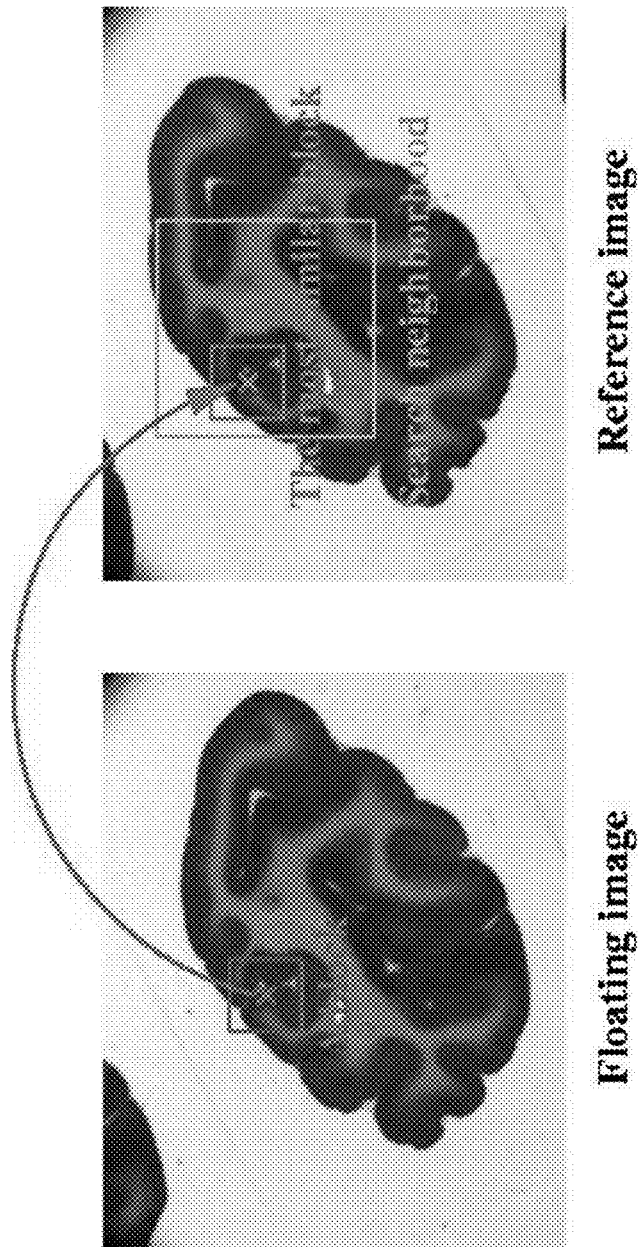
FIG. 12 shows images captured in consecutive frames of image data, showing how the system of the present invention determines the most similar block of images or image data to detect and track objects in frames of captured image data.

The flowchart of the proposed distance estimation method is shown in FIG. 8.

Figure 5:
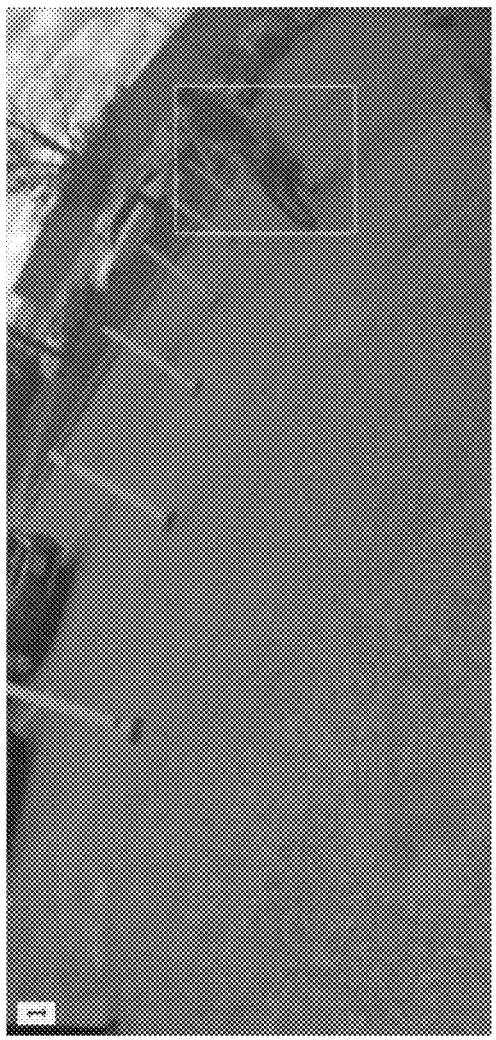
FIG. 5 is an image captured by a sideward and rearward viewing camera of a vehicle, showing a bicyclist approaching the vehicle.
Figure 6:
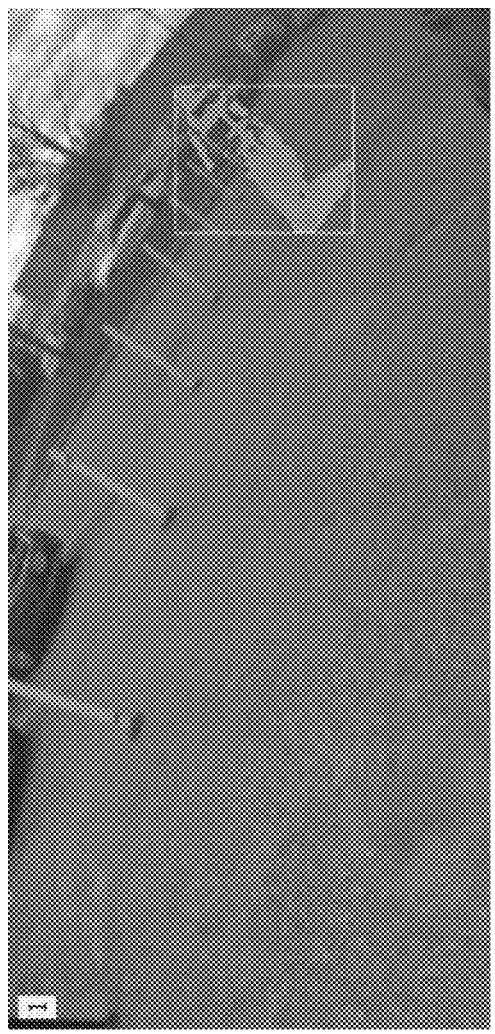
FIG. 6 is an image showing how the bicyclist is detected, such as via blob detection or the like, by the system of the present invention.

The current orientation of vertical objects viewed from the side camera in the DOP application is in a way that the leftmost point of the object is located on the ground (in FIGS. 5 and 6, the leftmost point of the object is at the ground, but for an opposite side camera, the rightmost point of the object would be at the ground). The system determines the outboard or distal point or portion of the object (that is farthest from the side of the equipped vehicle) and determines that the distal point is at the ground. The system uses this information to estimate the distance of the object from the side camera. The distance can be determined using the determined location of the distal point or portion of the object and the known height of the camera above the ground level.

Since the system has calibration information, it can readily un-warp the left most point in the image coordinate and calculate the ground world point coordinate using homography.

Different reasons can cause the issue of the sudden illumination variation, which can disqualify the background model. One of this cases is when camera auto exposure suddenly changes due to the existence of a large dark or white object close to the camera. The other case can be half cloudy days.

To be able to handle this challenge, the system may use statistical and histogram difference techniques to detect this issue. In this method the system detects the intensity level change that was happening to most image pixels. This method has the disadvantage that the same thing could happen when a large vehicle is very close to the camera.

Thus, the system may find the histogram of each frame and the difference between the two consecutive frames, which will show little change when the illumination is stable and a drastic peak when there is a sudden brightness variation.

Knowing this fact, it is possible to detect and raise a warning flag, as soon as illumination suddenly changes.

The present invention thus provides door open protection improvements and a proposed algorithm for the surround view system of a vehicle.

The present invention thus is operable to detect the presence or approach of a pedestrian or bicycle to determine if the detected object may collide with the door of the vehicle if the door is opened. The system processes image data captured by a single side camera of the vehicle and determines the distance to the detected object. The system, based on the angle of the side camera and the fact that the left most side of the object is at the ground, determines a 2D projection to find the x-y-z coordinates. Then, the system can determine distance to ground point and thus to the detected object.

Ground Model:

Image segmentation is a must for most Image processing and computer vision applications. Knowing the location of ground points can reduce the dimensionality of 3D computer vision calculations to 2D. The distance of objects around a vehicle can be evaluated with a simple projection knowing ground points.

The ground points segmentation of the system of the present invention uses the vehicle's kinematic model to find the distance traveled of the vehicle between two consecutive frames and to find the direction path of the vehicle between two frames. The system identifies and segments transformed image points that travel the same distance as the vehicle but in the opposite direction of the vehicle as ground points. The system also segments any other points as non-ground or as a three dimensional object. The system may then monitor the determined non-ground points to determine their movement, while not monitoring or tracking the determined ground points.

Block Matching:

The system of the present invention uses block matching, which may be used in various applications including stereo vision, visual tracking, object recognition, and video compression. A maximum efficiency is required while maintaining the accuracy especially for hardware implementation.

The system of the present invention provides a fast and efficient block matching process, which determines the fastest available block matching technique that still guarantees a global optimum. A first algorithm provides a winner-update strategy that decreases the number of calculations required by making better choices. Compared to an exhaustive search, the number of calculations is reduced up to 67 percent.

To increase the efficiency even more, the winner-update method is combined with a modified version of an "adaptive rood pattern search" algorithm. To include larger search areas, a coarse to fine method (Pyramid) is also utilized in the integration.

The present invention provides a low complexity system that combine three techniques. The system or processor processes captured image data by looking at a neighborhood area and picks where exactly in the neighborhood to look. The system roughly finds the location of the object (that was first detected in a first captured image and is being detected in a second or subsequent captured image) and then checks more details to find the exact location. A first algorithm used by the system may find the object faster by making better choices. A second algorithm may be modified to increase its accuracy while checking the search area and choosing how and where to search, so with just a few search points the system can determine or go to the exact location of object. A third algorithm may look at a larger area for faster moving objects.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014; WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or PCT Application No. PCT/US2014/042229, filed Jun. 13, 2014, and published Dec. 24, 2014 as International Publication No. WO 2014/204794, and/or U.S. patent applications, Ser. No. 14/535,739, filed Nov. 7, 2014, now U.S. Pat. No. 9,451,138; Ser. No. 14/524,203, filed Oct. 27, 2014, now U.S. Pat. No. 9,457,717; Ser. No. 14/519,469, filed Oct. 21, 2014, now U.S. Pat. No. 9,881,220; Ser. No. 14/391,841, filed Oct. 10, 2014, now U.S. Pat. No. 9,751,465; Ser. No. 14/489,659, filed Sep. 18, 2014, and published Apr. 2, 2015 as U.S. Patent Publication No. US-2015-0092042; Ser. No. 14/466,099, filed Aug. 22, 2014, now U.S. Pat. No. 9,712,002; Ser. No. 14/377,940, filed Aug. 11, 2014, and published Jan. 22, 2015 as U.S. Patent Publication No. US-2015-0022665; Ser. No. 14/377,939, filed Aug. 11, 2014, now U.S. Pat. No. 9,871,971; Ser. No. 14/456,164, filed Aug. 11, 2014, now U.S. Pat. No. 9,619,716; Ser. No. 14/456,163, filed Aug. 11, 2014, and published Feb. 12, 2015 as U.S. Patent Publication No. US-2015-0042807; Ser. No. 14/456,162, filed Aug. 11, 2014, and published Feb. 12, 2015 as U.S. Patent Publication No. US-2015-0042806; Ser. No. 14/373,501, filed Jul. 21, 2014, and published Jan. 29, 2015 as U.S. Patent Publication No. US-2015-0028781; Ser. No. 14/372,524, filed Jul. 16, 2014, and published Jan. 22, 2015 as U.S. Patent Publication No. US-2015-0022664; Ser. No. 14/324,696, filed Jul. 7, 2014, now U.S. Pat. No. 9,701,258; Ser. No. 14/369,229, filed Jun. 27, 2014, now U.S. Pat. No. 9,491,342; Ser. No. 14/316,940, filed Jun. 27, 2014, and published Jan. 8, 2015 as U.S. Patent Publication No. US-2015-0009010; Ser. No. 14/316,939, filed Jun. 27, 2014, and published Jan. 1, 2015 as U.S. Patent Publication No. US-2015-0002670; Ser. No. 14/303,696, filed Jun. 13, 2014, now U.S. Pat. No. 9,609,757; Ser. No. 14/303,695, filed Jun. 13, 2014, and published Dec. 25, 2014 as U.S. Patent Publication No. US-2014-0375476; Ser. No. 14/303,694, filed Jun. 13, 2014, now U.S. Pat. No. 9,260,095; Ser. No. 14/303,693, filed Jun. 13, 2014, and published Dec. 18, 2014 as U.S. Patent Publication No. 2014-0368654; Ser. No. 14/297,663, filed Jun. 6, 2014, and published Dec. 11, 2014 as U.S. Patent Publication No. US-2014-0362209; Ser. No. 14/362,636, filed Jun. 4, 2014, now U.S. Pat. No. 9,762,880; Ser. No. 14/290,028, filed May 29, 2014, now U.S. Pat. No. 9,800,794; Ser. No. 14/290,026, filed May 29, 2014, now U.S. Pat. No. 9,476,398; Ser. No. 14/359,341, filed May 20, 2014, now U.S. Pat. No. 10,071,687; Ser. No. 14/359,340, filed May 20, 2014, now U.S. Pat. No. 10,099,614; Ser. No. 14/282,029, filed May 20, 2014, now U.S. Pat. No. 9,205,776; Ser. No. 14/282,028, filed May 20, 2014, now U.S. Pat. No. 9,563,951; Ser. No. 14/358,232, filed May 15, 2014, now U.S. Pat. No. 9,491,451; Ser. No. 14/272,834, filed May 8, 2014, now U.S. Pat. No. 9,280,202; Ser. No. 14/356,330, filed May 5, 2014, now U.S. Pat. No. 9,604,581; Ser. No. 14/269,788, filed May 5, 2014, now U.S. Pat. No. 9,508,014; Ser. No. 14/268,169, filed May 2, 2014, and published Nov. 6, 2014 as U.S. Patent Publication No. US-2014-0327772; Ser. No. 14/264,443, filed Apr. 29, 2014, and published Oct. 30, 2014 as U.S. Patent Publication No. US-2014-0320636; Ser. No. 14/354,675, filed Apr. 28, 2014, now U.S. Pat. No. 9,580,013; Ser. No. 14/248,602, filed Apr. 9, 2014, now U.S. Pat. No. 9,327,693; Ser. No. 14/242,038, filed Apr. 1, 2014, now U.S. Pat. No. 9,487,159; Ser. No. 14/229,061, filed Mar. 28, 2014, now U.S. Pat. No. 10,027,930; Ser. No. 14/343,937, filed Mar. 10, 2014, now U.S. Pat. No. 9,681,062; Ser. No. 14/343,936, filed Mar. 10, 2014, and published Aug. 7, 2014 as U.S. Patent Publication No. US-2014-0218535; Ser. No. 14/195,135, filed Mar. 3, 2014, now U.S. Pat. No. 9,688,200; Ser. No. 14/195,136, filed Mar. 3, 2014, now U.S. Pat. No. 10,057,544; Ser. No. 14/191,512, filed Feb. 27, 2014, now U.S. Pat. No. 10,179,543; Ser. No. 14/183,613, filed Feb. 19, 2014, now U.S. Pat. No. 9,445,057; Ser. No. 14/169,329, filed Jan. 31, 2014, and published Aug. 7, 2014 as U.S. Patent Publication No. US-2014-0218529; Ser. No. 14/169,328, filed Jan. 31, 2014, now U.S. Pat. No. 9,092,986; Ser. No. 14/163,325, filed Jan. 24, 2014, and published Jul. 31, 2014 as U.S. Patent Publication No. US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published Jun. 19, 2014 as U.S. Patent Publication No. US-2014-0168437; Ser. No. 14/098,817, filed Dec. 6, 2013, and published Jun. 19, 2014 as U.S. Patent Publication No. US-2014-0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, now U.S. Pat. No. 10,025,994; Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/016,790, filed Oct. 3, 2013, now U.S. Pat. No. 9,761,142; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published Jan. 23, 2014 as U.S. Patent Publication No. US-2014-0025240; Ser. No. 13/942,753, filed Jul. 16, 2013, and published Jan. 30, 2014 as U.S. Patent Publication No. US-2014-0028852; Ser. No. 13/927,680, filed Jun. 26, 2013, and published Jan. 2, 2014 as U.S. Patent Publication No. US-2014-0005907; Ser. No. 13/916,051, filed Jun. 12, 2013, now U.S. Pat. No. 9,077,098; Ser. No. 13/894,870, filed May 15, 2013, now U.S. Pat. No. 10,089,537; Ser. No. 13/887,724, filed May 6, 2013, now U.S. Pat. No. 9,670,895; Ser. No. 13/852,190, filed Mar. 28, 2013, and published Aug. 29, 2013 as U.S. Patent Publication No. US-2013-0222593; Ser. No. 13/851,378, filed Mar. 27, 2013, now U.S. Pat. No. 9,319,637; Ser. No. 13/848,796, filed Mar. 22, 2012, and published Oct. 24, 2013 as U.S. Patent Publication No. US-2013-0278769; Ser. No. 13/847,815, filed Mar. 20, 2013, and published Oct. 31, 2013 as U.S. Patent Publication No. US-2013-0286193; Ser. No. 13/800,697, filed Mar. 13, 2013, now U.S. Pat. No. 10,182,228; Ser. No. 13/785,099, filed Mar. 5, 2013, now U.S. Pat. No. 9,565,642; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published Aug. 22, 2013 as U.S. Patent Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,143,898; Ser. No. 13/653,577, filed Oct. 17, 2012, now U.S. Pat. No. 9,174,574; and/or Ser. No. 13/534,657, filed Jun. 27, 2012, and published Jan. 3, 2013 as U.S. Patent Publication No. US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012, and published Jan. 3, 2013 as U.S. Patent Publication No. US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
   a camera disposed at a side of a vehicle and having a field of view exterior of the vehicle, wherein the camera comprises an imaging array having at least one million photosensor elements arranged in rows and columns, and wherein the camera is operable to capture frames of image data;
   an image processor operable to process multiple frames of image data captured by the camera;
   wherein, with the vehicle parked, the vehicular vision system processes via the image processor image data captured by the camera to detect a three dimensional object that is present in a detection zone at least partially along the side of the parked vehicle;
   wherein, responsive to processing of captured image data by the image processor, the vehicular vision system determines a distal portion of the detected three dimensional object relative to the parked vehicle and determines a ground location at which the determined distal portion of the detected three dimensional object is located;
   wherein, with the vehicle parked, the vehicular vision system processes via the image processor multiple frames of image data to track the detected three dimensional object present in the detection zone to determine movement of the detected three dimensional object relative to the parked vehicle;
   wherein, responsive to tracking the detected three dimensional object, the vehicular vision system is operable to determine that the detected three dimensional object is in a danger zone at a side door of the parked vehicle;
   wherein the danger zone comprises a sub-region of the detection zone at the side of the vehicle, and
   wherein the danger zone includes a sweep area that the side door swings through when the side door is opening; and wherein, with the side door of the parked vehicle closed, and at least in part responsive to determination that the detected three dimensional object is in the danger zone, the vehicular vision system limits opening of the side door of the parked vehicle.

2. The vehicular vision system of claim 1, wherein, with the side door of the parked vehicle closed, and at least in part responsive to determination that the detected three dimensional object is in the danger zone, the vehicular vision system generates an alert to an occupant of the parked vehicle.

3. The vehicular vision system of claim 1, wherein, with the vehicle parked, the vehicular vision system processes via the image processor multiple frames of image data captured by the camera to determine whether the detected three dimensional object present in the detection zone is approaching the danger zone.

4. The vehicular vision system of claim 1, wherein, responsive to processing of captured image data by the image processor, the vehicular vision system determines a ground location at which the detected three dimensional object is located.

5. The vehicular vision system of claim 4, wherein, responsive to the determined ground location of the detected three dimensional object relative to the vehicle and based at least in part on height of the camera relative to the ground surface on which the vehicle is parked, the vehicular vision system determines distance to the detected three dimensional object.

6. The vehicular vision system of claim 5, wherein the vehicular vision system determines distance to the detected three dimensional object using two dimensional information.

7. The vehicular vision system of claim 1, wherein the vehicular vision system detects the three dimensional object responsive at least in part to a determination of a sudden illumination change via processing of captured image data.

8. The vehicular vision system of claim 7, wherein, responsive to a determination of the sudden illumination change, the vehicular vision system merges an illumination invariant edge based technique.

9. The vehicular vision system of claim 1, wherein the vehicular vision system is operable to (i) use a first algorithm to initially detect the three dimensional object and (ii) use a second algorithm to increase accuracy of detection of the three dimensional object.

10. The vehicular vision system of claim 1, wherein the vehicular vision system is operable to (i) use a first algorithm to find the ground location at which the determined distal portion of the detected three dimensional object is located and (ii) use a second algorithm to increase accuracy of determination of the ground location at which the determined distal portion of the detected three dimensional object is located.

11. The vehicular vision system of claim 10, wherein the second algorithm selects where to search to determine the ground location at which the determined distal portion of the detected three dimensional object is located.

12. The vehicular vision system of claim 10, wherein the vehicular vision system is operable to use a third algorithm that searches a larger area to detect objects moving faster than the tracked three dimensional object.

13. The vehicular vision system of claim 1, wherein the vehicular vision system does not track objects within the field of view of the camera that are outside of the detection zone.

14. A vehicular vision system, the vehicular vision system comprising:
a camera disposed at a side of a vehicle and having a field of view exterior of the vehicle, wherein the camera comprises an imaging array having at least one million photosensor elements arranged in rows and columns, and wherein the camera is operable to capture frames of image data;
an image processor operable to process multiple frames of image data captured by the camera;
wherein, with the vehicle parked, the vehicular vision system processes via the image processor image data captured by the camera to detect a pedestrian that is present in a detection zone at least partially along the side of the parked vehicle;
wherein, responsive to processing of captured image data by the image processor, the vehicular vision system determines a distal portion of the detected pedestrian relative to the parked vehicle and determines a ground location at which the determined distal portion of the detected pedestrian is located;
wherein, with the vehicle parked, the vehicular vision system processes via the image processor multiple frames of image data to track the detected pedestrian present in the detection zone to determine movement of the detected pedestrian relative to the parked vehicle;
wherein the vehicular vision system does not track objects within the field of view of the camera that are outside of the detection zone;
wherein, responsive to tracking the detected pedestrian, the vehicular vision system is operable to determine that the detected pedestrian is in a danger zone at a side door of the parked vehicle;
wherein the danger zone comprises a sub-region of the detection zone at the side of the vehicle, and wherein the danger zone includes a sweep area that the side door swings through when the side door is opening; and
wherein, with the side door of the parked vehicle closed, and at least in part responsive to determination that the detected pedestrian is in the danger zone, the vehicular vision system limits opening of the side door of the parked vehicle.

15. The vehicular vision system of claim 14, wherein, with the side door of the parked vehicle closed, and at least in part responsive to determination that the detected pedestrian is in the danger zone, the vehicular vision system generates an alert to an occupant of the parked vehicle.

16. The vehicular vision system of claim 14, wherein, with the vehicle parked, the vehicular vision system processes via the image processor multiple frames of image data captured by the camera to determine whether the detected pedestrian present in the detection zone is approaching the danger zone.

17. The vehicular vision system of claim 14, wherein, responsive to processing of captured image data by the image processor, the vehicular vision system determines a ground location at which the detected pedestrian is located.

18. The vehicular vision system of claim 17, wherein, responsive to the determined ground location of the detected pedestrian relative to the vehicle and based at least in part on height of the camera relative to the ground surface on which the vehicle is parked, the vehicular vision system determines distance to the detected pedestrian.

19. The vehicular vision system of claim 18, wherein the vehicular vision system determines distance to the detected pedestrian using two dimensional information.

20. A vehicular vision system, the vehicular vision system comprising:
a camera disposed at a side of a vehicle and having a field of view exterior of the vehicle, wherein the camera comprises an imaging array having at least one million photosensor elements arranged in rows and columns, and wherein the camera is operable to capture frames of image data;
an image processor operable to process multiple frames of image data captured by the camera;
wherein, with the vehicle parked, the vehicular vision system processes via the image processor image data captured by the camera to detect a bicycle that is present in a detection zone at least partially along the side of the parked vehicle;
wherein, responsive to processing of captured image data by the image processor, the vehicular vision system determines a distal portion of the detected bicycle relative to the parked vehicle and determines a ground location at which the determined distal portion of the detected bicycle is located;

wherein, with the vehicle parked, the vehicular vision system processes via the image processor multiple frames of image data to track the detected bicycle present in the detection zone to determine movement of the detected bicycle relative to the parked vehicle;

wherein, responsive to tracking the detected bicycle, the vehicular vision system is operable to determine that the detected bicycle is in or approaching a danger zone at a side door of the parked vehicle;

wherein the danger zone comprises a sub-region of the detection zone at the side of the vehicle, and wherein the danger zone includes a sweep area that the side door swings through when the side door is opening; and wherein, with the side door of the parked vehicle closed, and at least in part responsive to determination that the detected bicycle is in or approaching the danger zone, the vehicular vision system limits opening of the side door of the parked vehicle.

21. The vehicular vision system of claim 20, wherein, with the side door of the parked vehicle closed, and at least in part responsive to determination that the detected bicycle is in or approaching the danger zone, the vehicular vision system generates an alert to an occupant of the parked vehicle.

22. The vehicular vision system of claim 20, wherein the vehicular vision system does not track objects within the field of view of the camera that are outside of the detection zone.

23. The vehicular vision system of claim 20, wherein, responsive to processing of captured image data by the image processor, the vehicular vision system determines a ground location at which the detected bicycle is located.

24. The vehicular vision system of claim 23, wherein, responsive to the determined ground location of the detected bicycle relative to the vehicle and based at least in part on height of the camera relative to the ground surface on which the vehicle is parked, the vehicular vision system determines distance to the detected bicycle.

25. The vehicular vision system of claim 24, wherein the vehicular vision system determines distance to the detected bicycle using two dimensional information.

\* \* \* \* \*

UNITED STATES PATENT AND TRADEMARK OFFICE
CERTIFICATE OF CORRECTION

PATENT NO. : 11,393,217 B2
APPLICATION NO. : 17/248777
DATED : July 19, 2022
INVENTOR(S) : Leila Sabeti Page 1 of 1

It is certified that error appears in the above-identified patent and that said Letters Patent is hereby corrected as shown below:

In the Claims

Column 12
Line 17, Claim 1, "afield" should be --a field--

Signed and Sealed this
Thirtieth Day of August, 2022

Katherine Kelly Vidal
*Director of the United States Patent and Trademark Office*